United States Patent Office 3,191,118
Patented June 22, 1965

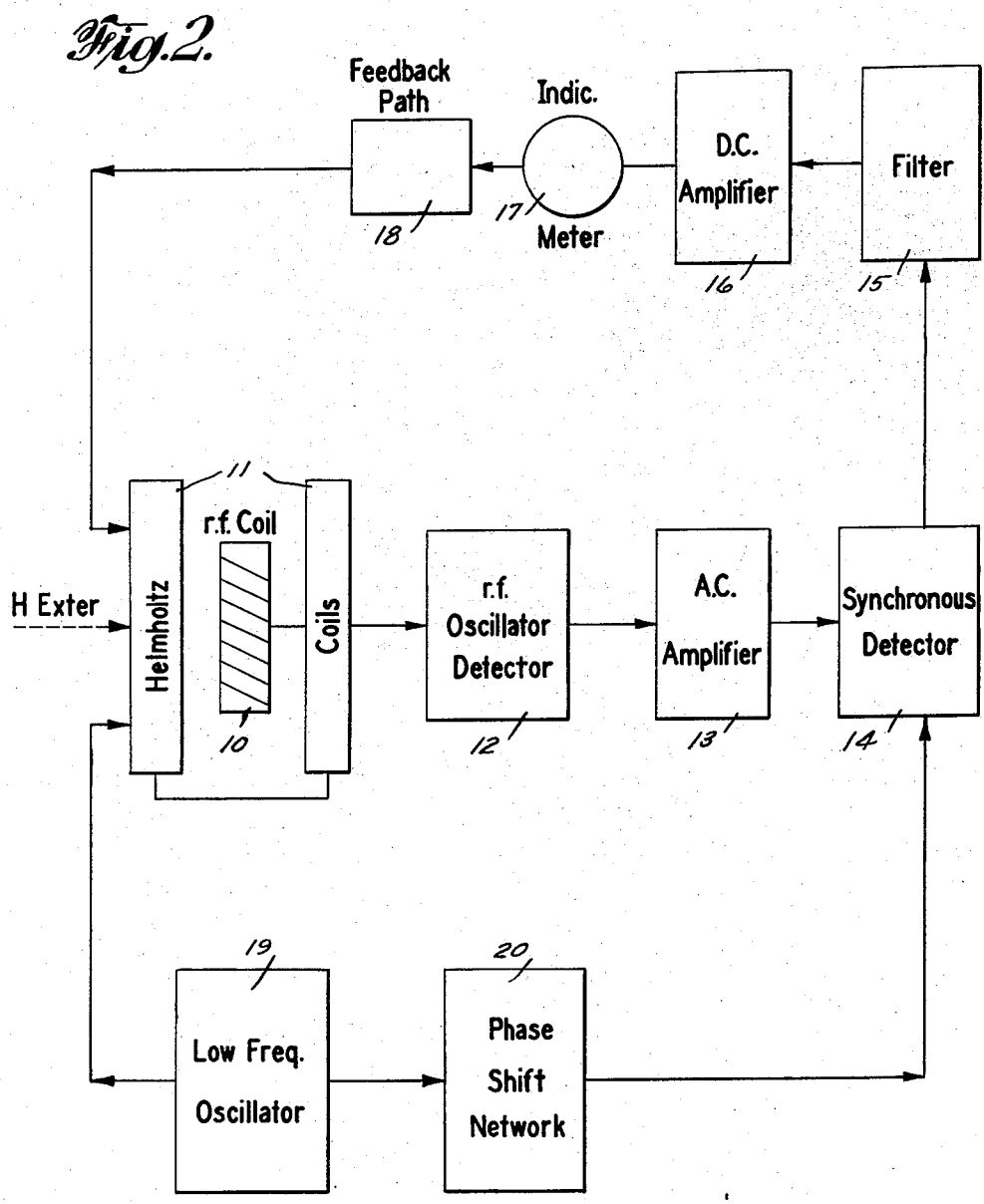

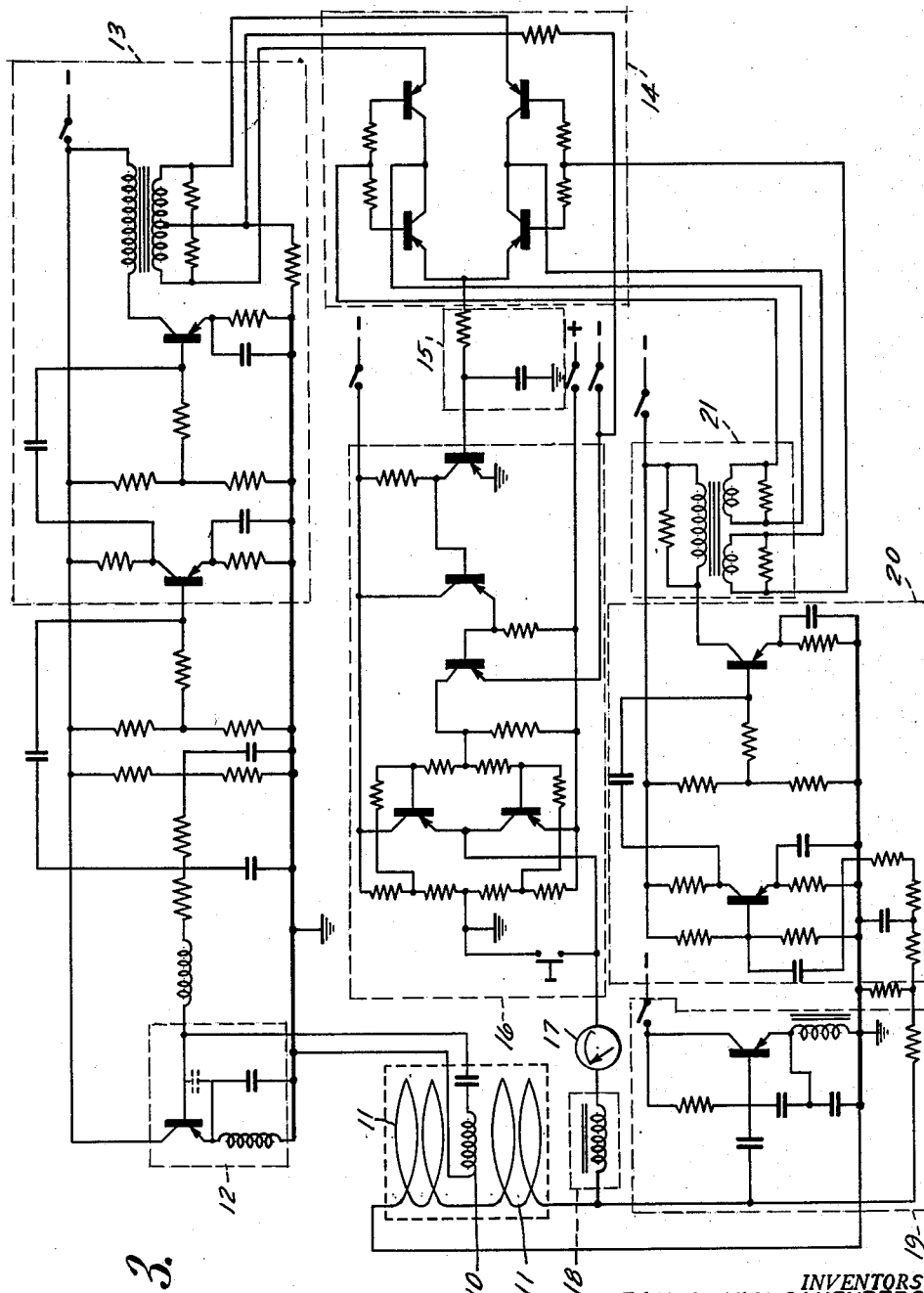

3,191,118
MAGNETOMETER
Paul Jung, Brussels, and Jean Leon Van Cakenberghe, Beersel, Belgium, assignors to Union Carbide Corporation, a corporation of New York
Filed Feb. 6, 1958, Ser. No. 713,626
3 Claims. (Cl. 324—.5)

The present invention relates to the determination of magnetic fields. More particularly, it relates to the determination of weak magnetic fields by using the resonance properties shown by paramagnetic substances when they are submitted to magnetic fields.

The accurate measurement of weak magnetic fields, such as the Earth's magnetic field, is a basic operation in geophysics. The classical method uses instruments which measure the mechanical forces exerted by the Earth's magnetic field upon a permanent magnet. These instruments are essentially static and cannot be used, for instance in a vehicle in motion or for geophysical prospection. A progress in this direction is the magnetometer in which the Earth's magnetic field is measured by its influence upon the magnetisation of a saturable inductor to which is applied an alternating voltage. This instrument needs calibration prior to the measurement and, in addition, its response to change in the Earth's magnetic field is relatively slow. A more recent method is based upon the resonance properties of the proton. The measurement of the Earth's magnetic field can be achieved by measuring the frequency of free precession of protons in this field. The nuclear magnetometer based upon this principle appears to be a sensitive instrument but has a relatively slow response and does not permit the evaluation of the direction of the magnetic field which is measured. Other resonance methods are inadequate for measuring weak magnetic fields as well as their direction.

The object of the invention is to overcome the foregoing and related disadvantages of the prior art. A further object of this invention is to produce a device suitable for ultra-rapid determination of weak magnetic fields. A still further object of this invention is the development of a novel process for measurements of magnetic fields. Other objects of the invention will appear from the description and the figures which follow, in which FIGURE 1 shows a curve, FIGURE 2 gives a block-diagram of the apparatus of the invention and FIGURE 3 shows, in a schematic form, a miniaturized magnetometer.

FIGURE 2 is a block diagram of magnetometer apparatus according to the present invention indicating the combination and arrangement of electronic and magnetic componentry; and FIGURE 3 is a schematic diagram showing a fully transistorized embodiment of apparatus according to the present invention and corresponding to the block diagram of FIGURE 2.

Figure 1A:
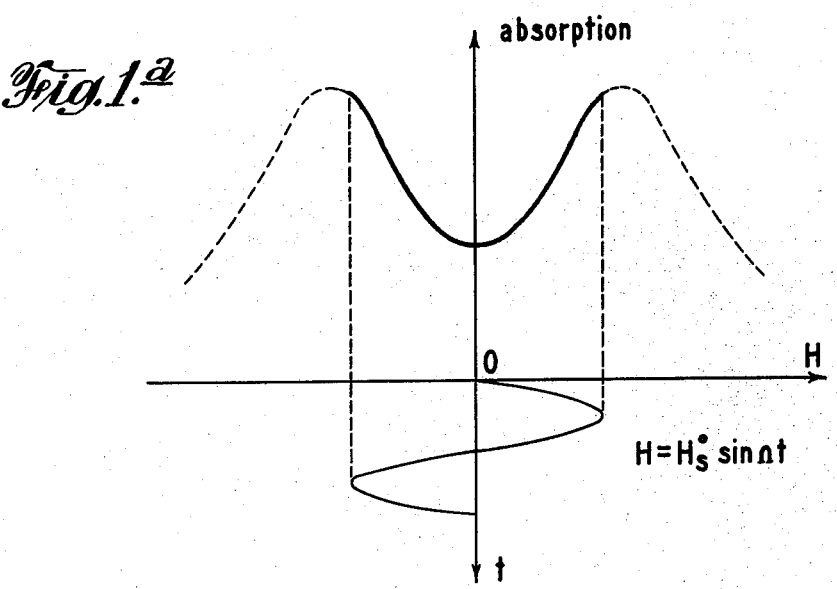
FIGURE 1a is a graph showing the actual variation of the resonance absorption of a paramagnetic substance due to a sweep field H, with no external magnetic field present.

These objects have been achieved in accordance with this invention by a process for measuring external magnetic fields, their magnitude and their direction, which comprises the step of measuring the variation dissymmetry of the resonance absorption of a paramagnetic substance placed into a pure alternating sweep field, said dissymmetry being introduced by said external magnetic field, said substance having a single resonance line the width of which is 0.1 to 10 times the maximum absolute value of the said external magnetic field.

The objects of the invention have further been met by the production of an apparatus comprising a paramagnetic substance having a single resonance line the width of which is 0.1 to 10 times the maximum absolute value of the external magnetic field which is measured, a generator means for imposing a high frequency magnetic field on said substance, a second generator means for imposing a low frequency field on said substance, said imposed low frequency field being perpendicular to said high frequency field, a means for detecting the variation in energy absorbed by said substance, the output of said detecting means being the input signal of a lock-in detector in which the reference signal is a signal derived from said low-frequency generator means.

According to present invention, it has been discovered that one can accurately measure static and dynamic external magnetic fields, both in magnitude and direction, by measuring the influence of said magnetic field upon the electronic resonance absorption of a paramagnetic substance.

For a clear understanding of the invention, consideration will be given to the principles upon which it is based by a brief discussion.

When a paramagnetic substance, such as a free radical for instance, is placed in a constant magnetic field H, the angular momentum of the paramagnetic particle, e.g. the electron, precesses about the axis of H with an angular frequency $w_r$ given by Equation 1:

$$w_r = g\left(\frac{e}{2mc}\right)H \qquad (1)$$

where $\frac{w_r}{2\pi}$ is the resonance frequency $g$ the spectroscopic splitting factor
$e$ the electron charge
$m$ the electron mass
$c$ the velocity of light.

If a rotating magnetic field $H_1$ is also imposed to the said particle and if the field direction and frequency are such that $H_1$ rotates about H in synchronism with the angular momentum vector, then a constant couple acts on the latter, making it ultimately to turn over and to reverse its projection on H. This phenomenon corresponds to an exchange of energy from the rotating magnetic field to the paramagnetic particle and is referred to as the magnetic resonance phenomenon. Since there is an inverse relaxation process which converts the energy into heat, the net result is an absorption of energy by the said particle. This absorption of energy can be detected as a signal in an external circuit. The rotating magnetic field can be replaced by a linear polarised magnetic field $H_s$ which is equivalent to the sum of two magnetic fields rotating in reverse direction. Thus the resonance condition for a given paramagnetic substance can be obtained by imposing simultaneously upon said substance a high frequency magnetic field and a direct current magnetic field the direction of which is perpendicular to that one of the high frequency magnetic field.

A more detailed discussion on nuclear magnetic resonance phenomena can be found in "Nuclear Magnetic Resonance" by E. R. Andrews, Cambridge University Press, Cambridge, 1955, ch. 2.

Thus, the present invention results from the discovery that, when the said resonance condition is obtained for the previous system, one can measure the magnitude and the direction of a static or dynamic magnetic field external to the system by measuring the variation dissymmetry introduced by said external field upon the resonance absorption of said substance. The said variation dissymmetry results in a periodic signal the fundamental component of which is proportional to said external magnetic field. The said periodic signal can easily be detected through a suitable device and transformed, by amplification and filtration, into a signal which, in turn, is proportional to the magnitude of the said magnetic field and changes its sign with the direction of the said field.

Therefore in the process of the present invention, the paramagnetic substance is submitted to a high frequency magnetic field and to a low frequency magnetic field, hereinafter referred to as the sweep field, the axis of said sweep field being perpendicular to the direction of said high frequency field. The low frequency field sweeps the magnetic field scale from $-H_s$ to $+H_s$, $H_s$ being an arbitrary value of the magnetic field expressed in gauss, with a frequency $\omega$. The absorption of energy by said substance takes up the values corresponding to magnetic fields from $-H_s$ to $+H_s$.

In absence of a constant external magnetic field H, the absorption varies symmetrically with respect to zero of the sweep field since it is the same for the positive half cycle of the sweep field as for the negative one. Since the sweep field is a periodic function of frequency $\omega$, the variation in absorption is also a periodic function of frequency $2\omega$. The actual variation in absorption due to the sweep field in absence of an external magnetic field is shown in FIGURE 1a.

Figure 1B:
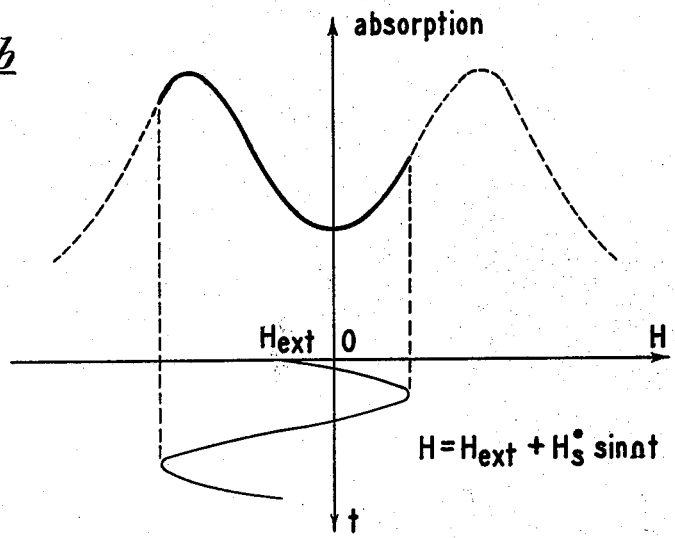
FIGURE 1b is a graph showing the actual variation of the resonance absorption of a paramagnetic substance due to a sweep field H, in the presence of an external magnetic field.

In presence of a constant external magnetic field H, the low frequency field sweeps the magnetic field scale from $(-H_s+H)$ to $(+H_s+H)$ gauss and this shift makes the variation in absorption unsymmetric with respect to the zero field. This dissymmetry results into a signal which includes the fundamental frequency and all its multiples. The amplitude of the fundamental component is, in first approximation, proportional to the said external magnetic field and reverses its sign with the said external magnetic field. An exact analysis of the time variation in the absorption, due to the sweep field in presence of an external magnetic field, shows that the amplitude of its fundamental component is only approximately a linear function of said external magnetic field. The actual variation in absorption due to the sweep field in presence of an external magnetic field is shown in FIGURE 1b.

One can eliminate the error due to the non-linearity of the response by opposing a direct magnetic field to the external field, thus by transforming the method into a null-method. This can be achieved by manually compensating the external magnetic field and by measuring the magnitude of the compensating current by any conventional means. Therefore the said process benefits from all the advantages inherent to a null-method, such as elimination of errors introduced by fluctuations in frequency, amplitude, temperature, gain, etc.

A preferred procedure for achieving the advantages of a null-method consists in a continuous compensation of the external magnetic field by means of a direct magnetic field which can be supplied automatically by a feedback method.

The substance used in the process of the invention is a paramagnetic substance having a single resonance line such as free radicals in the solid state or in solution, free electrons in solution, paramagnetic substances having, in the solid state or in solution, partly filled electron shells like the transition elements for instance. The substances found useful for the process include diphenyl-nitroso-phenyl-hydrazil, diphenyl-picryl-hydrazil, sodium in liquid ammonia, elements of the iron group and of the rare earth group. The preferred substances are those having a resonance-line-width which, when expressed in gauss, is comprised between 0.1 and 10 times the magnitude of the external magnetic field to be measured.

The resonance absorption of said paramagnetic substance is obtained by imposing upon said substance a high frequency magnetic field and a low frequency field, said low frequency being used as a sweep field and its direction being perpendicular to the axis of the said high frequency field.

The said alternating sweep field is a low frequency field the amplitude of which can take any value. The sweep field frequency must be smaller than the resonance-line-width of said paramagnetic substance, expressed in frequency.

The present invention includes also a process for measuring static and dynamic external magnetic fields, their magnitude and their direction, which comprises the step of measuring the variation dissymmetry of the resonance absorption of a paramagnetic substance placed into a pure alternating sweep field, said substance having a single resonance line the width of which is 0.1 to 10 times the maximum absolute value of the said magnetic field, while continuously opposing a direct magnetic field to the said external magnetic field.

It is apparent from the aforesaid description that the said periodic signal can be detected as a change in impedance in a coil, which change can, in turn, be detected, amplified and filtered by means of a suitable device, in order to retain only the fundamental component of said signal. This can be achieved, for instance, by means of one of the bridge methods, such as the bridge arrangement of Bloembergen, Purcell and Pound, used for studying the paramagnetic resonance absorption (see loc. cit. ch. 3).

The apparatus of the invention is a device comprising a paramagnetic substance having a single paramagnetic resonant line, a generator means for imposing a high frequency magnetic field on said substance, a second generator means for imposing a low frequency magnetic field on said substance, said low frequency field being perpendicular to said imposed high frequency field, a means for detecting the variation in energy absorbed by said substance, the output of said detecting means being the input signal for a lock-in detector in which the reference signal is a signal derived from said low frequency generator means.

The first generator means must be such as to impose a high frequency field the amplitude of which does not saturate the absorption of said paramagnetic substance and the frequency of which is larger than the resonance line-width of said substance, expressed in frequency.

The second generator means must be such as to impose a low frequency field the amplitude of which can take any value. Its optimal value is comprised between zero and five times the value of the resonance field. The sweep field frequency must be smaller than the resonance line-width of said paramagnetic substance expressed in frequency.

The detecting means consists in any system capable of detecting the resonance absorption as a change in impedance across the circuit, said change being for instance measured as a change in the radio-frequency voltage and followed by a suitable amplification, or being measured by means of a suitable bridge.

The lock-in detector consists in synchronous, phase-sensitive mechanical or electrical switching system capable of discrimination between the fundamental frequency component and its multiples.

It is preferred that the said apparatus is equipped with a feedback circuit in order to impose automatically a direct magnetic field which continuously opposes the magnetic field which is measured.

Thus the preferred apparatus of the invention includes a device comprising a paramagnetic substance having a single paramagnetic resonance line, a generator means for imposing a high frequency magnetic field on said substance, a second generator means for imposing a low frequency magnetic field on said substance, said low frequency field being perpendicular to said imposed high frequency field, a means for detecting the variation in energy absorbed by said substance, the output of said detecting means being the input signal for a lock-in detector in which the reference signal is a signal derived from said low frequency generator means, the direct component at the output of said lock-in detector being amplified and fed back for opposing a direct magnetic field to said external magnetic field.

The several parts of the said apparatus can be clearly made up of tubes, transistors, or similar devices. The preferred apparatus is a fully transistorized magnetometer which which will be more easily understood by reference to the block diagram given in FIG. 2 and to the following description.

Referring now to FIGS. 2 and 3, a radio frequency coil 10 having a paramagnetic substance therein is positioned between modulating coils 11 which produce a sweep-field around the radio frequency coil. A radio-frequency oscillator detector 12 is used to detect the absorption of high frequency energy in the paramagnetic substance within the radio frequency coil. An A.C. amplifier 13 amplifies the alternating signal from the radio-frequency oscillator detector 12 and this signal is analyzed by the synchronous detector 14 which separates the signal having the same frequency as that from the low frequency oscillator 19. Filter 15 is employed to increase the sensitivity of the system by suppressing noise from the synchronous detector 14 and the radio-frequency oscillator detector 12. A D.C. amplifier 16 amplifies the signal from filter 15 and the intensity of the external magnitude field can be measured on indicator meter 17. A separate direct current feedback path 18 makes it possible to apply both alternating and direct current to the modulating coils 11 so as to compensate for the effect of the external magnetic field and return the system to the null-balance condition. The low frequency oscillator-generator 19 energizes the modulating coils 11 and the phase shift network 20, which adjusts the synchronous detector 14. In FIG. 3 is shown, additionally, a coupling transformer 21.

It is to be understood that the circuit of FIGS. 2 and 3 is not the only circuit capable of carrying out the method of the present invention.

The paramagnetic substance is surrounded by a radio-frequency coil, impressing upon it a high frequency magnetic field, by a low frequency coil, which takes the form of Helmholtz coils, the axis of which is perpendicular to the axis of the high frequency field. These three components are contained in a unit made up of insulating material and referred to as the radio-frequency head.

The signal, due to the variation of the paramagnetic absorption, is developed across a resistance in the radio-frequency oscillator-1st detector unit and amplified, by means of the A.C. amplifier, to a convenient level for the synchronous detection. A reference signal, which is taken from the low frequency oscillator through a phase shift network, is fed into the synchronous detector. The D.C. signal appearing at the output of said detector is proportional to the fundamental component of frequency ω. The filtered signal is once more amplified and fed back to the low frequency coil. The direct magnetic field, which is built up by the current fed back, opposes in direction and in magnitude to the external magnetic field. Since there is an exact linear relationship between the current and the magnetic field in a coil, thus the direct current read over the indicator meter is proportional to the magnitude of the external magnetic field.

The direction of the said external magnetic field can also be determined by means of the said apparatus. It is noteworthy that one only measures the component of the said external field along the axis of the sweep field. A complete determination of the said external magnetic field, at any point O in the space, can be obtained according to the following procedure. This radio-frequency head is moved about an axis perpendicular to the axis of the sweep field until a zero current is read over the indicator meter. This condition indicates that the external magnetic field lies in a plane which is perpendicular to the axis of the sweep field. One then aligns the axis of said sweep field with that plane and one makes this axis to rotate in that plane until a maximum current is read over the indicator meter. The said maximum current corresponds to the magnitude of the external magnetic field and the direction of the said external field is given by the direction of the sweep field axis.

One can perform the foregoing manipulation in a single operation by using three independents sweep magnetic fields perpendicular to each other and by simultaneously recording their corresponding output signal.

A preferred procedure consists of using two components of the said three sweep fields the output signals of which pilot a servo-mechanism capable of putting them by rotation into a zero-output condition. It is clear that the third component will be then aligned along the direction of the external magnetic field.

It is also possible to send the resonance signal via a radio transmitter and to use it for telemetering the orientation of an object in space, using as reference the direction of the Earth's magnetic field.

The radio-frequency head is in form of small cubic box (5 cm. side) made up of a low-loss insulating material such as glass, steatite or Plexiglas and contains the paramagnetic substance, the radio-frequency oscillator coil and the Helmholtz coils which are placed with their axis perpendicular to the axis of the radio-frequency coil.

The radio-frequency oscillator-1st detector consists of a 2N247 transistor used in a Clapp type oscillator circuit. The amplitude stability is controlled by the automatic polarisation resulting from a resistance R placed in series in the transistor-base lead and from the diode made up by the transistor. The signal across R is about 1 mv. peak to peak but in zero field it contains only second harmonics of the sweep field frequency.

The A.C. amplifier comprises two stages of conventional grounded emitter amplifiers. The presence of an unavoidable second harmonic signal limits the A.F. amplification to such a value that no saturation is produced. The output signal is fed by a center tapped transformer to the lock-in detector.

The said lock-in detector is a full wave synchronous detector using four transistors in a configuration which eliminates restrictions on input voltage levels. The filter network is part of the load circuit of the said lock-in detector.

The D.C. amplifier consists in three amplifying stages which precede the push-pull complementary symmetry output stage. The load of this stage is formed by the D.C. indicating meter, a decoupling coil and by the low frequency coil.

The low frequency oscillator is of the Clapp type. A resistor provides a leakage path to the phase shift network. The output of this network is amplified by two conventional grounded emitter stages, the latter being transformer-coupled to the synchronous detector.

The orginality of the feedback system used in the said apparatus consists of utilising the same coil to produce the sweep magnetic field and to produce the feedback magnetic field. This feature is essential for obtaining the same geometry for both fields.

This can be achieved by putting a decoupling network between the low frequency generator and the D.C. generator. This network should offer a low resistance to the D.C. feedback current but should have only a small loading effect for the sweep field generator. This is obtained by choosing a low resistance choke the inductance of which is much larger than the inductance of the Helmholtz coils.

The performances of the said apparatus are given in the following purely illustrative example.

*Example*

The magnetometer used was identical to the foregoing and described apparatus. Its radio-frequency head contained 1 gr. of $\alpha,\alpha'$-diphenyl-$\beta$-picryl-hydrazil, the resonance line-width of which is about 2 gauss.

The technical specifications read as follows:

| | |
|---|---|
| High frequency | 7.7 mc. |
| Low frequency | 4 kc. |
| High frequency coil: | |
| Q | 140. |
| Inductance | 18.1 µh. |
| Low frequency coil (Helmholtz coils) | 2 x 800. |
| Turns in series: | |
| Resistance | 50 ohms. |
| Inductance | 63 mh. |
| Diameter | 42 mm. |
| Time constant of the filter network | 0.1 sec. |
| Range | −1 to +1 gauss. |
| Power consumption: | |
| Zero signal | 53 mw. |
| Maximum signal | 80 mw. |

One observes that an external magnetic field of 1 gauss corresponds to a current of 3.1 ma. over the indicator meter.

In these conditions, the minimum value of magnetic fields which can be detected is $10^{-4}$ gauss and the minimum value of angular variation of said magnetic field which can be detected is equal to $2.10^{-4}$ radians. The relative error on the magnetic field determination is about $10^{-4}$.

The ultimate sensitivity which can be obtained with the said magnetometer is limited by the signal-to-noise ratio of the system. The signal increases with an increasing number of free radicals while the noise decreases with a high Q radio-frequency coil, with a lower temperature and with a smaller bandwidth of the system. One way for achieving thus a greater sensitivity consists of using a larger quantity of said paramagnetic substance or of choosing a substance having an exceptionally large number of unpaired electrons per mole. By using sodium in liquid ammonia, as a sensitive substance having a resonance line-width of about 50 mgauss, one can magnify the weak magnetic field scales by a factor of 20. It is possible, in these conditions, to determine external magnetic fields with a precision of approximately 1 micro-gauss within the range of 50 milligauss.

The said magnetometer is a versatile instrument for measuring magnetic fields which offers many advantages over conventional devices. Due to its light weight and to its small, compact size, the said magnetometer can be carried very easily and used in various types of conditions. It offers all the advantages inherent to null-instruments and offers also an extreme simplicity of operation since no preliminary calibration is needed and since both the magnitude and the direction of said field are determined in a single operation. The rapidity of the response, even to minute change in the value of the external magnetic field, permits one to evaluate or to follow up ultrarapid variations in the external magnetic field. The said magnetometer is also particularly sensitive to weak magnetic fields of the order of 1 or 2 gauss. The said magnetometer is a particularly well adapted instrument for measuring the Earth's magnetic field and is local perturbations. It can be extensively used for geophysical prospection, geophysical surveys, determination of ores and similar magnetic materials. Another use will be as a stabilization instrument in planes, rockets and projectiles or as a direction device for the guidance of airplanes and rockets or as sensitive element in magnetic sensitive weapons or projectiles.

As many apparently widely different embodiments of this invention may be made without departing from the spirit and scope hereof, it is to be understood that the invention is not limited to the specific embodiments hereof except as defined in the appended claims.

What is claimed is:

1. Apparatus for measuring an external magnetic field comprising a paramagnetic material having a single magnetic resonance absorption line the width of which expressed in magnetic field intensity units, is 0.1 to 10 times the absolute maximum value of the external field to be measured, said resonance line exhibiting peak resonance absorption values symmetrically disposed on opposite sides of a minimum absorption value, resonance absorption structure comprising first generator means for imposing on said material a first alternating magnetic field at a first frequency larger than said line width expressed in frequency units, and second means for imposing on said material a second alternating magnetic field at a frequency lower than said first frequency, and oriented substantially perpendicular to said first alternating field, means for adjusting said second alternating field to symmetrically sweep said resonance line through said minimum absorption value, said second alternating field being adapted to define with said external field, a resultant sweep field on said material asymmetrically biased with respect to said minimum absorption value by an amount dependent on the magnitude of said field to be measured, and means responsive to said resonance absorption structure for detecting corresponding asymmetric variations in the resonance absorption of said material as a measure of said external field.

2. Apparatus for measuring an external magnetic field comprising a paramagnetic material having a single magnetic resonance absorption line the width of which expressed in magnetic field intensity units, is 0.1 to 10 times the absolute maximum value of the external field to be measured, said resonance line exhibiting peak resonance absorption values symmetrically disposed on opposite sides of a minimum absorption value occurring at zero external magnetic field, resonance absorption structure comprising first generator means for imposing on said material a first alternating magnetic field at a first frequency larger than said line width expressed in frequency units, and second means for imposing on said material a second alternating magnetic field at a frequency lower than said first frequency, and oriented substantially perpendicular to said first alternating field, means for adjusting said second alternating field to symmetrically sweep said resonance line through said minimum absorption value, said second alternating field being adapted to define with said external field, a resultant sweep field on said material asymmetrically biased with respect to said minimum absorption value by an amount dependent on the magnitude of said field to be measured, and means responsive to said resonance absorption structure for detecting corresponding asymmetric variations in the resonance absorption of said material as a measure of said external field.

3. Apparatus for measuring an external magnetic field comprising a paramagnetic material having a single magnetic resonance absorption line the width of which expressed in magnetic field intensity units, is 0.1 to 10 times the absolute maximum value of the external field to be measured, said resonance line exhibiting peak resonance absorption values symmetrically disposed on opposite sides of a minimum absorption value occurring at zero external magnetic field, resonance absorption structure comprising first generator means for imposing on said material a first alternating magnetic field at a first frequency larger than said line width expressed in frequency units, and second means for imposing on said material a second alternating magnetic field at a frequency lower than said first frequency, and oriented substantially perpendicular to said first alternating field, means for adjusting said second alternating field to symmetrically sweep said resonance line through said minimum absorption value in absence of said external magnetic field, said second alternating field being adapted to define with said external field, a resultant sweep field on said material asymmetrically biased with respect to said minimum absorption value by an amount dependent on the magnitude of said field to be measured, and means responsive to said resonance absorption structure for detecting corresponding asymmetric variations in the resonance absorption of said material as a measure of said external field.

References Cited by the Examiner

UNITED STATES PATENTS

| | | | |
|---|---|---|---|
| 2,589,494 | 3/52 | Hershberger | 324—0.5 |
| 2,845,595 | 7/58 | Leete | 324—.5 |
| 2,894,199 | 7/59 | Kirchner | 324—0.5 |
| 2,922,947 | 1/60 | Bloom et al. | 324—0.5 |
| 2,975,360 | 3/61 | Bell | 324—0.5 X |
| 3,113,263 | 12/63 | Collins | 324—0.5 |

FOREIGN PATENTS 746,114  3/56  Great Britain.

OTHER REFERENCES

Bell Laboratories Record, April 1953, pp. 121–126.

Townes et al.: Physical Review, Vol. 77, No. 1, January 1950, p. 148.

Thomas et al.: Journal of Research of the National Bureau of Standards, Research Paper RR 2104, Vol. 44, June 1950, pp. 569–573.

Herve: Academie Des Sciences, Comptes Rendus, Vol. 244, No. 11, March 1957, pp. 1475–1478.

Herve: Academie Des Sciences, Comptes Rendus, Vol. 245, No. 6, August 1957, pp. 653–656.

Gabillard: Academie Des Sciences, Comptes Rendus, Vol. 237, No. 14, October 1953, pp. 705–708.

Garstens: Physical Review, Vol. 81, No. 4, Feb. 15, 1951, p. 645.

Becker: Physical Review, Vol. 99, No. 6, Sept. 15, 1955, pp. 1681–1683.

CHESTER L. JUSTUS, *Primary Examiner.*

NORMAN H. EVANS, *Examiner.*